(12) United States Patent
Ali et al.

(10) Patent No.: US 11,649,098 B1
(45) Date of Patent: May 16, 2023

(54) FOOD STORAGE CONTAINERS FORMED AT LEAST PARTIALLY FROM POST-CONSUMER RECYCLED POLYMERIC MATERIAL

(71) Applicant: Printpack Illinois, Inc., Elgin, IL (US)

(72) Inventors: Ilias Ali, Bengaluru (IN); Daniel C. Sanders, West Point, VA (US); Hoo In Won, Richmond, VA (US); Harold Stephen Bowen, Hayes, VA (US); Matthew Shaun Liwanag, Williamsburg, VA (US); John Craig Small, Mathews, VA (US); Siyi Wang, Newport News, VA (US); David T. Foster, Williamsburg, VA (US)

(73) Assignee: Printpack Illinois, Inc., Elgin, IL (US)

( * ) Notice: Subject to any disclaimer, the term of this patent is extended or adjusted under 35 U.S.C. 154(b) by 0 days.

(21) Appl. No.: 17/060,218

(22) Filed: Oct. 1, 2020

Related U.S. Application Data

(60) Provisional application No. 63/036,607, filed on Jun. 9, 2020, provisional application No. 62/909,514, filed on Oct. 2, 2019.

(51) Int. Cl.
| | |
|---|---|
| *B65D 75/30* | (2006.01) |
| *B29C 65/00* | (2006.01) |
| *B29C 51/26* | (2006.01) |
| *B32B 27/36* | (2006.01) |
| *B29L 31/00* | (2006.01) |
| *B29K 67/00* | (2006.01) |

(52) U.S. Cl.
CPC ............ *B65D 75/30* (2013.01); *B29C 51/267* (2013.01); *B29C 66/72341* (2013.01); *B32B 27/36* (2013.01); *B29K 2067/00* (2013.01); *B29L 2031/712* (2013.01); *B32B 2439/70* (2013.01)

(58) Field of Classification Search
CPC ... B65D 75/30; B29C 51/267; B29C 66/7234; B32B 27/36; B32B 2439/70; B29K 2067/00; B29L 2031/712
See application file for complete search history.

(56) References Cited

U.S. PATENT DOCUMENTS

| | | | | |
|---|---|---|---|---|
| 5,064,724 A | * | 11/1991 | Ofstein | ............... B29B 17/0042 428/501 |
| 5,693,283 A | * | 12/1997 | Fehn | ...................... B32B 27/32 264/513 |

(Continued)

FOREIGN PATENT DOCUMENTS

| | | | | |
|---|---|---|---|---|
| WO | WO-9703802 | * | 2/1997 | ............. B29C 47/04 |

*Primary Examiner* — Michael C Miggins
(74) *Attorney, Agent, or Firm* — Additon, Pendleton & Witherspoon, P.A.

(57) ABSTRACT

A container thermoformed from a polymeric multilayer sheet includes a cavity for containing food. The sheet includes a polymeric interior layer positioned between (i) a polymeric outer layer of the sheet and (ii) a polymeric inner layer of the sheet that is in opposing face-to-face relation with, and at least partially defines, the cavity of the container. The interior layer includes post-consumer recycled polymeric material. The sheet includes a polymeric barrier layer positioned between the interior layer and inner layer. The barrier layer restricts inward passage of at least some of any gasses originating from the post-consumer recycled polymeric material.

17 Claims, 10 Drawing Sheets

(56) References Cited

U.S. PATENT DOCUMENTS

| | | |
|---|---|---|
| 9,657,155 B2 | 5/2017 | O'Brien et al. |
| 9,708,092 B2 | 7/2017 | Bowen et al. |
| 9,950,849 B2 | 4/2018 | Sanders et al. |
| 10,293,539 B2 | 5/2019 | Chougule et al. |
| 10,336,498 B2 | 7/2019 | Foster et al. |
| 2014/0120217 A1 | 5/2014 | O'Brien et al. |
| 2014/0120218 A1 | 5/2014 | O'Brien et al. |
| 2016/0176097 A1* | 6/2016 | Chougule ............... B29C 49/02 264/515 |
| 2020/0047448 A1 | 2/2020 | Foster et al. |

\* cited by examiner

US 11,649,098 B1

FOOD STORAGE CONTAINERS FORMED AT LEAST PARTIALLY FROM POST-CONSUMER RECYCLED POLYMERIC MATERIAL

CROSS-REFERENCE TO PRIORITY APPLICATIONS

The present application claims the benefit of each of U.S. Provisional Patent Application Nos. 62/909,514 and 63/036,607, each of which is incorporated herein by reference in its entirety.

BACKGROUND

This disclosure relates generally to multilayer containers for food storage.

Polymers or plastics such as polypropylene (PP), polyethylene (PE), polyethylene terephthalate (PET), etc. are ubiquitous in everyday life due to their low production cost, excellent balance of material properties, and their excellent functional performance. Polymers/plastics are widely used in a variety of applications, such as in food packaging, the automotive industry, medical packaging and devices, personal and health care goods, and many more. Most of these polymers are produced synthetically from fossil sources such as petrochemicals and natural gases. The manufacturing of these plastics from fossil sources generates greenhouse gases such $CO_2$, $CH_4$, etc., which are believed to negatively impact our environment.

The extensive use of plastics has resulted in millions of tons of plastic waste being generated every year. Much of the plastic waste is landfilled and some of the plastic waste is recycled. A significant portion of the plastic waste is found in the environment as litter and pollutants that are potentially harmful to our natural ecosystems. For example, plastic waste is often washed into rivers and, ultimately, out to sea.

Recycling (mechanical, chemical, etc.) of plastic waste is one of the solutions for mitigating plastic waste issues. Recycling diverts plastic waste away from landfills and helps to keep plastic waste out of our natural ecosystems. Recycling can potentially reduce the demand for virgin plastic made from fossil fuel sources.

Plastic that has been used by a consumer, disposed of, and recycled is typically referred to as post-consumer recycled (PCR) plastic. It is common for a material recovery facility (MRF) to receive post-consumer materials that have been mixed into a single stream. At MRFs, the post-consumer materials are typically sorted and washed. The sorted and washed post-consumer plastics can be processed to produce PCR plastic pellets.

Due to potential contamination, the PCR plastic pellets may have undesirable properties such as relatively poor physical properties (e.g., undesirable melt flow rate), undesirable odor, and undesirable color. These undesirable properties can make PCR plastic unsuitable for use in some products, such as food storage containers.

SUMMARY

An aspect of this disclosure is the provision of a food storage container thermoformed from a multilayer material, wherein post-consumer recycled (PCR) polymeric material may be substantially encapsulated in the multilayer material. The encapsulating can substantially isolate the cavity of the container from any undesirable contaminants in the PCR polymeric material. Typically extensive efforts may be made to avoid including any undesirable contaminants in any PCR polymeric material of food storage containers. That said, it is believed that limited amounts of undesirable contaminants may be included in the PCR polymeric material in some situations.

When a majority of the PCR polymeric material is a predetermined type of polymeric material, possible contaminants of the PCR polymeric material may include different types of polymeric materials, volatile compounds (e.g., aroma compounds), undesirable colorants, and/or any other contaminants that may typically be associated with PCR polymeric material, as would be understood by those of ordinary skill in the art. In an embodiment of this disclosure, the PCR polymeric material of the container is substantially encapsulated in the container's multilayer material in a manner that seeks to restrict at least some of any gasses (e.g., volatilized aroma compounds) from traveling (e.g., emitting) from the PCR polymeric material to the container cavity.

A thermoformed container for food may include a polymeric multilayer sheet at least partially defining each of a base of the container and at least one sidewall of the container, wherein the sidewall extends upwardly from a periphery of the base and at least partially around a cavity of the container, and the cavity is configured for containing food. The sheet may include a polymeric interior layer positioned between (i) a polymeric outer layer of the sheet and (ii) a plurality of inner layers of the sheet. The interior layer may include PCR polymeric material. The plurality of inner layers may include a polymeric barrier layer positioned between the cavity and the interior layer. The barrier layer may be configured to restrict inward passage of at least some of any gasses originating from the PCR polymeric material.

As a further example, the interior layer, which may include PCR polymeric material, can be positioned between (e.g., "sandwiched between") inner and outer barrier layers. Each of the barrier layers may be configured to restrict passage of at least some of any gasses originating from the PCR polymeric material. The PCR polymeric material and one or more other layers of the multilayer sheet may include one or more polyolefins, polyesters, and/or other suitable thermoplastic polymers. The one or more barrier layers may comprise thermoplastic polymeric material having barrier properties exceeding barrier properties of polyolefins and/or polyesters.

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings are provided as examples and may not be drawn to scale. The present invention may be embodied in many different forms and should not be construed as limited to the examples depicted in the drawings.

DETAILED DESCRIPTION

Examples of embodiments are disclosed in the following. The present invention may, however, be embodied in many different forms and should not be construed as limited to the embodiments set forth herein. For example, features disclosed as part of one embodiment or example can be used in the context of another embodiment or example to yield a further embodiment or example. As another example of the breadth of this disclosure, it is within the scope of this disclosure for one or more of the terms "substantially," "about," "approximately," and/or the like, to qualify each of the adjectives and adverbs of the Detailed Description section of disclosure, as discussed further below.

Figure 1:
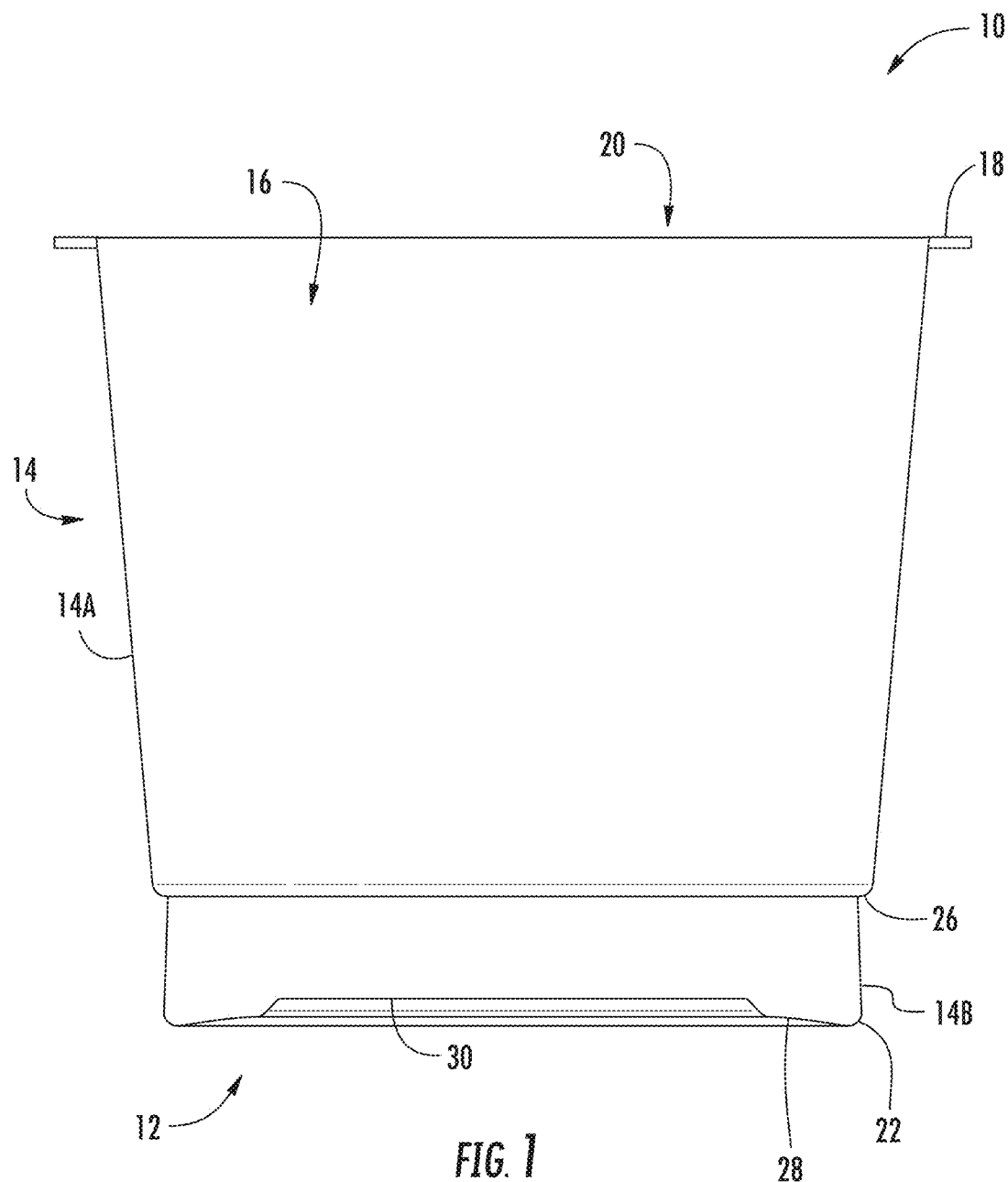
FIG. 1 is a schematic, side cross-sectional view of a container in accordance with a first embodiment of this disclosure.

A wide variety of differently configured food storage containers are within the scope of this disclosure. As an example, FIG. 1 schematically depicts a food storage container 10 of a first embodiment of this disclosure. The container 10 of the first embodiment is typically thermoformed from a multilayer sheet (see, e.g., sheets of FIGS. 3-6, 11 and 12) that may include post-consumer recycled (PCR) polymeric material. Typically the PCR polymeric material is at least partially encapsulated in the multilayer material of the container 10 in a manner that seeks to restrict at least any inward egress (e.g., diffusion) of any contaminants that may be associated with the PCR polymeric material.

As an example, the PCR polymeric material can comprise, consist essentially of, or consist of thermoplastic polyolefin (e.g., polypropylene (PP) and/or polyethylene (PE)) and/or thermoplastic polyester (e.g., polyethylene terephthalate (PET)). The PCR polymeric material can be encapsulated (e.g., substantially encapsulated) in the multilayer sheet of the container 10, for example by being included in one or more interior layers of the multilayer sheet, and being sandwiched between layers comprising one or more barrier layers. Accordingly, the PCR polymeric material can be encapsulated (e.g., substantially encapsulated) in the multilayer material of the container 10, for example by being included in one or more interior layers of the multilayer material of the container, and being sandwiched between layers comprising one or more barrier layers. The encapsulating/sandwiching of the PCR polymeric material between the layers seeks to prevent any negative issues that may be associated with any migration (e.g., at least inward egress) of any contaminants that may be associated with the PCR polymeric material, and any associated organoleptics (e.g., tasting or smelling of any aroma compounds that may be associated with the PCR polymeric material).

The first embodiment container 10 includes at least one sidewall portion 14 extending upwardly from (e.g., upwardly from proximate) the periphery of a base or base wall portion 12 of the container. The at least one sidewall 14 extends around a cavity 16 of the container 10. An annular, outwardly protruding flange or rim portion 18 can extend from (e.g., from proximate) the upper end of the sidewall 14 and surround an opening 20 to the cavity 16.

The first embodiment container 10 can include the PCR polymeric material encapsulated (substantially encapsulated) between other layers of the container, so that the PCR polymeric material is concealed (e.g., substantially concealed) from contents of the container and concealed (e.g., substantially concealed) from persons such as consumers that interact with the container. Regarding versions of the container 10 in which PCR polymeric material is substantially encapsulated and substantially concealed from consumers, a relatively small portion of the PCR polymeric material may be relatively minimally exposed to consumers in a negligible manner at the outer peripheral edge of the multilayer rim 18, as will be understood by those of ordinary skill in the art.

The sidewall 14 can be described as including annular upper and lower sidewall sections 14A, 14B. The upper sidewall section 14A can be frustoconical (substantially frustoconical) so that, when empty, several of the containers 10 can be stacked or nested together. The lower sidewall section 14B can be in the form of a cylindrical collar (e.g., a substantially cylindrical collar) so that an annular shoulder 26 is defined between the middle and lower sidewall sections 14A, 14B.

An annular heel portion 22 can be defined between and/or connects the outer edge of the base 12 and the lower edge of the lower sidewall section 14B to one another. The base 12 can include an annular outer portion 28 positioned between the heal 22 and an annular central portion 30 of the base. The base central portion 30 can be upwardly/inwardly recessed relative to the base outer portion 28.

The container 10 can be configured differently than depicted in FIG. 1, for example by being more rectangular than round. As another example, a variety of differently configured bases 12 are within the scope of this disclosure. The base 12, heel portion 22, and/or sidewall sections 14A, 14B can define, include, and/or have connected thereto one or more features (not shown) such as, but not limited to, indentation(s), recess(es), flute(s), protrusion(s), rib(s), support structure(s), shoulder(s), step(s), or the like.

Figure 2:
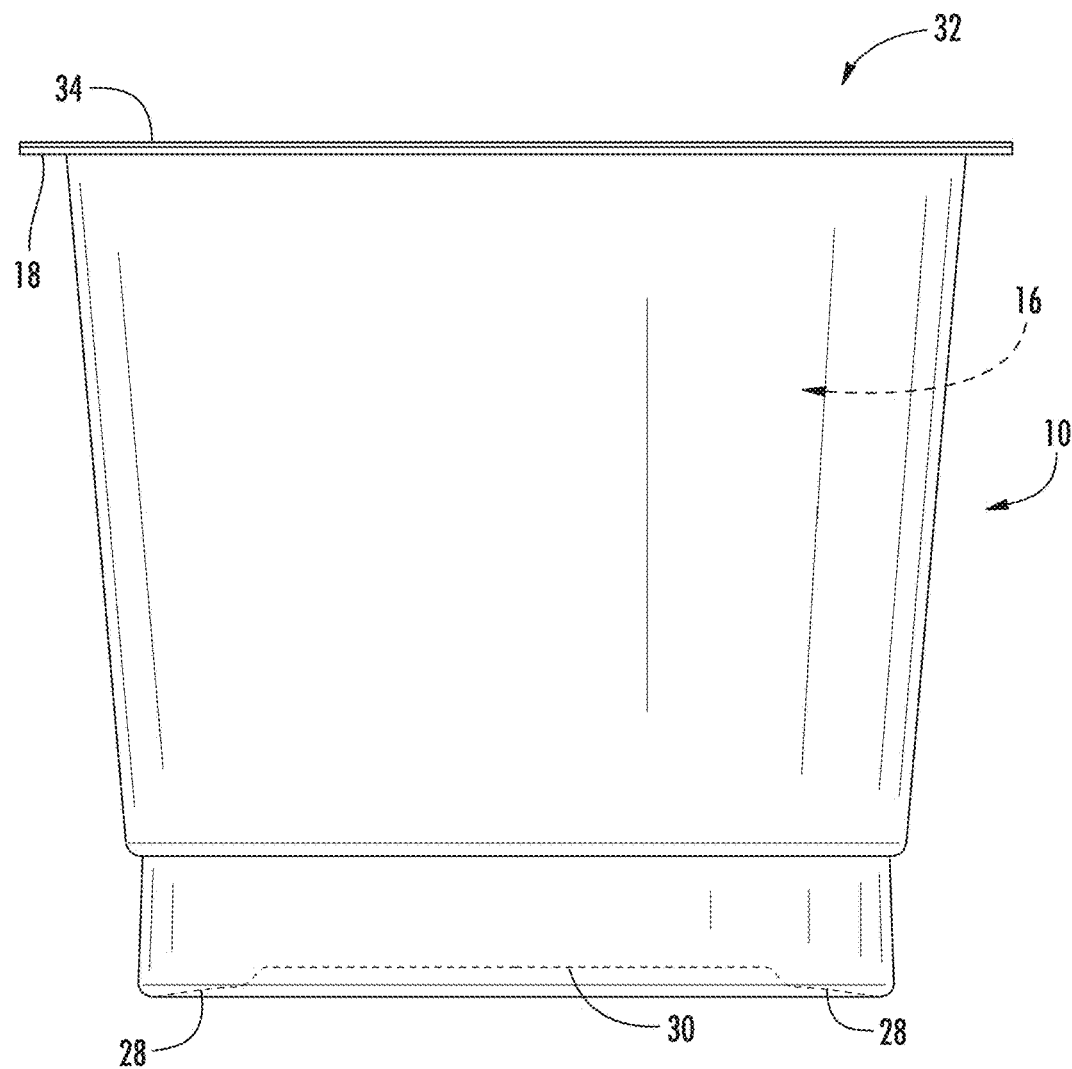
FIG. 2 is a schematic side view of a package including a cover mounted to the container of FIG. 1, wherein the base of the container is hidden from view and schematically depicted with dashed lines, in accordance with the first embodiment.

Referring to FIG. 2, the container 10 can be part of a package 32, for example by being the main structural part of the package. The package 32 can include a cover 34 having an annular margin that is fixedly mounted to (e.g., hermetically sealed to) the upper surface of the rim or flange 18 to close the opening 20 to the container cavity 16. The cover 34 can be formed of an impermeable and imperforate material that may be pierced or removed for providing access to the contents of the container 10. The cover 34 can comprise a polymer film and/or metallic foil that is adhered (e.g., heat-sealed) to the flange 18 of the container 10. The cover 34 typically includes at least one barrier layer configured to restrict passage of light and gasses (e.g., air, nitrogen gas, water vaper, and volatilized aroma compounds).

A variety of differently configured containers 10 and packages 32 are within the scope of this disclosure. In the example depicted in FIGS. 1 and 2, the container 10 is in the form of a cup, or the like, with a flange or rim 18. Alternatively, the container 10 can be in the form of a tray or in any other desirable shape.

In the first embodiment, the container 10 is thermoformed from a coextruded sheet (e.g., a thermoplastic multilayered sheet or laminate ("the precursor sheet") comprising polyolefin-based material, for example PP. At least some of the PP can be PCR PP that is encapsulated (e.g., substantially encapsulated) in the precursor sheet, for example by being included in one or more interior layers, as discussed further below.

Figure 3:
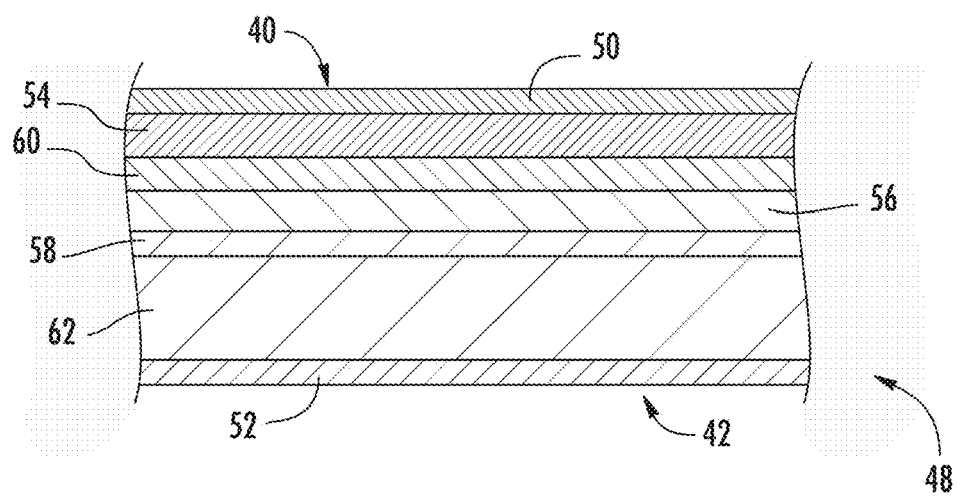
FIG. 3 is a schematic cross-sectional view of a portion of material that is representative of both the material of the container of FIG. 1, and a precursor sheet from which the container of FIG. 1 can be thermoformed, in accordance with the first embodiment of this disclosure.

FIG. 3 is a schematic cross-sectional view of a portion of an example of a laminate/thermoplastic sheet 48 of the first embodiment, wherein the cross section is taken through the thickness of the thermoplastic material. In the first embodiment, the thermoplastic sheet 48 is representative of (e.g., substantially representative of) both the precursor sheet from which the container 10 can be thermoformed and the thermoplastic material of the fully-formed container 10.

The thermoplastic sheet 48 has opposite first and second sides or exterior surfaces 40, 42. In the first embodiment, after a piece of the sheet 48 has been formed into a container 10, a respective portion of the sheet's first surface 40 is an inner surface of the container that is in opposing face-to-face relation with, extends around, and at least partially defines the container cavity 16; and the sheet's second surface 42 is an exterior surface of the container that is in opposing face-to-face relation with the ambient environment.

In the first embodiment, the thermoplastic sheet 48 can be a laminate formed by coextrusion and/in any other suitable manner so that it includes opposite inner and outer cap layers 50, 52, a buffer layer 54, a barrier layer 56, outer and inner tie layers 58, 60, and an interior layer 62. Generally described with regard to the embodiment depicted in FIG. 3, the thermoplastic sheet 48 can be a multilayered film having seven layers: inner cap layer 50/buffer layer 54/inner tie layer 60/barrier layer 56/outer tie layer 58/interior layer 62/outer cap layer 52. More generally and as discussed further below, the multilayered film or sheet 48 and container 10 can have different numbers of layers, for example eight layers or more, twelve layers, thirteen layers, or any other suitable number of layers. As a more specific example, the multilayered film or sheet 48 and container 10 can further include at least one additional layer, for example at least one skim layer that may be in the form of a skim coat (see, e.g., skim coat 94' of FIG. 11).

Reiterating from above, each container 10 can be thermoformed from a section of the sheet 48 such that the outer cap layer 52 defines the exterior surface of the container 10, and the inner cap layer 50 is in opposing face-to-face relation with, and defines, the container cavity 16. When the first embodiment container 10 includes the flange 18, the inner cap layer 50 defines an exterior (e.g., upper) surface of the flange 18 so that the cover 34 (FIG. 2) is adhered to the flange's cap layer 50. One or more of the layers 50, 52, 54, 56, 58, 60, 62 may be omitted and/or rearranged in the thermoplastic sheet 48 and container 10, and/or one or more additional layers may be included in the thermoplastic sheet and container (see, e.g., skim coat 94' of FIG. 11).

Each of the cap and buffer layers 50, 52, 54 of the thermoplastic sheet 48 can comprise, consist of, or consist essentially of PP (e.g., virgin PP) and/or other suitable polymeric materials. For example, for one or more of, or each of, the cap and buffer layers 50, 52, 54, at least about 90% by weight of the polymeric material of the layer can be virgin polymer, at least about 93% by weight of the polymeric material of the layer can be virgin polymer, at least about 96% by weight of the polymeric material of the layer can be virgin polymer, at least about 98% by weight of the polymeric material of the layer can be virgin polymer, at least about 99% by weight of the polymeric material of the layer can be virgin polymer, at least about 99.5% by weight of the polymeric material of the layer can be virgin polymer, at least about 99.9% by weight of the polymeric material of the layer can be virgin polymer, 100% by weight of the polymeric material of the layer can be virgin polymer, at least about 90% by weight of the layer can be virgin polymer, at least about 93% by weight of the layer can be virgin polymer, at least about 96% by weight of the layer can be virgin polymer, at least about 98% by weight of the layer can be virgin polymer, at least about 99% by weight of the layer can be virgin polymer, at least about 99.5% by weight of the layer can be virgin polymer, at least about 99.9% by weight of the layer can be virgin polymer, 100% by weight of the layer can be virgin polymer, or any ranges or values therebetween.

The sheet 48 as a whole is typically substantially impermeable and imperforate, at least partially due to, or mostly due to, the barrier layer 56 (e.g., high barrier layer) being configured to restrict passage of gasses (e.g., air, nitrogen gas, water vaper, and volatilized aroma compounds). The material of the barrier layer 56 can have barrier properties exceeding barrier properties of the other layers of the sheet 48. The barrier layer 56 of the first embodiment can comprise, consist essentially of, or consist of ethylene vinyl alcohol (EVOH), although the one or more barrier layers of the sheet 48 may more generally comprise EVOH, nylon, G-polymer, and/or any other suitable material. The tie layers 58, 60 can comprise PP modified with tie material (e.g., maleic anhydride and/or any other suitable materials). The interior layer 62 can comprise, consist of, or consist essentially of "regrind." Regarding the regrind, numerous of the containers 10 can be thermoformed from a section of the thermoplastic sheet 48 such that remnants of the thermoplastic sheet remain after the containers are formed, and the remnants may be reground and extruded to form the interior or regrind layer 62.

In one example, the interior layer 62 can comprise, consist of, or consist essentially of the regrind and/or PCR polymeric material (e.g., PCR PP), and the PCR polymeric material may be omitted from the other layers 50, 52, 54, 58, 60, although variations are within the scope of this disclosure. For example, at least about 50% by weight of the polymeric material of the interior layer 62 can be PCR polymeric material, at least about 70% by weight of the polymeric material of the interior layer 62 can be PCR polymeric material, at least about 80% by weight of the polymeric material of the interior layer 62 can be PCR polymeric material, at least about 90% by weight of the polymeric material of the interior layer 62 can be PCR polymeric material, at least about 95% by weight of the polymeric material of the interior layer 62 can be PCR polymeric material, at least about 99% by weight of the polymeric material of the interior layer 62 can be PCR polymeric material, 100% by weight of the polymeric material of the interior layer 62 can be PCR polymeric material, at least about 50% by weight of the interior layer 62 can be PCR polymeric material, at least about 70% by weight of the interior layer 62 can be PCR polymeric material, at least about 80% by weight of the interior layer 62 can be PCR polymeric material, at least about 90% by weight of the interior layer 62 can be PCR polymeric material, at least about 95% by weight of the interior layer 62 can be PCR polymeric material, at least about 99% by weight of the interior layer 62 can be PCR polymeric material, 100% by weight of the interior layer 62 can be virgin polymer, or any ranges or values therebetween.

Whereas any one or more of the PP-based layers 50, 52, 54, 58, 60, 62 may include PCR polymeric material (e.g., PCR PP), the PCR polymeric material can be (e.g., may typically be) isolated in one or more of the interior layers. For example, the PCR polymeric material may be present solely in the interior layer 62. As a more general example, PCR polymeric material can be omitted from the inner cap layer 50 and be included in one or more of the other PP-based layers 50, 54, 58, 60, 62, wherein the inner cap layer 50 can comprise, consist essentially of, or consist of virgin PP and/or other suitable materials. In another example, the PCR polymeric material can be omitted from both of the inner and outer cap layers 50, 52 and be included in one or more of the other PP-based layers 54, 58, 60, 62, wherein the inner and outer cap layers 50, 52 can comprise, consist essentially of, or consist of virgin PP and/or other suitable materials (e.g., white or other suitably colored colorant). The PCR polymeric material (e.g., polyolefin (e.g., PP and/or PE) and/or thermoplastic polyester (e.g., polyethylene terephthalate)) can be positioned inside the thermoplastic sheet 48 in a manner so that the PCR polymeric material will not come in contact with food contained by the container 10, and the PCR polymeric material will substantially not come in contact with consumers.

In accordance with a specific version of the first embodiment, the PCR polymeric material is PCR PP that is gray in color and/or transparent, and is FDA (The U.S. Food and Drug Administration) compliant for food packaging applications. Also in accordance with the first embodiment, the PCR polymeric material (e.g., PCR PP) may or may not (e.g., can) contain PE as a contaminant. On the one hand, the PCR polymeric material may not include any aroma compounds (odorant, aroma, fragrance, or flavor). On the other hand, it is believed that in some implementations of this disclosure the PCR polymeric material considered in isolation may include one or more aroma compounds that are present as a very small, yet detectable or measurable, percentage of the PCR polymeric material (e.g., PCR PP). It is believed that in some implementations of this disclosure aroma compounds originating from, for example food or food residue, may have become attached to the PCR polymeric material through sorption prior to the PCR polymeric material being washed at a material recovery facility, or the like. The PCR polymeric material can optionally be blended with virgin PP.

The precursor thermoplastic sheet 48 can have a thickness of about 45.2 mils, in a range of from about 40.6 mils to about 49.7 mils, in a range of from about 36.1 mils to about 54.2 mils, or any values or subranges therebetween. At least one of, or each of, the cap layers 50, 52 of the precursor sheet 48 can have a thickness of about 5 mils, in a range of from about 4.5 mils to about 5.5 mils, in a range of from about 4 mils to about 6 mils, or any values or subranges therebetween. For at least one of, or each of, the cap layers 50, 52, the percentage of the volume of the precursor sheet 48 occupied by the cap layer can be about 11.0%, in a range of from about 9.9% to about 12.1%, in a range of from about 8.8% to about 13.2%, or any values or subranges therebetween. The buffer layer 54 of the precursor sheet 48 can have a thickness of about 9.9 mils, in a range of from about 8.9 mils to about 10.9 mils, in a range of from about 7.9 mils to about 11.9 mils, or any values or subranges therebetween. The percentage of the volume of the precursor sheet 48 occupied by the buffer layer 54 can be about 21.9%, in a range of from about 19.7% to about 24.1%, in a range of from about 17.5% to about 26.3%, or any values or subranges therebetween. The barrier layer 56 of the precursor sheet 48 can have a thickness of about 1.4 mils, in a range of from about 1.3 mils to about 1.5 mils, in a range of from about 1.1 mils to about 1.7 mils, or any values or subranges therebetween. The percentage of the volume of the precursor sheet 48 occupied by the barrier layer 56 can be about 3.0%, in a range of from about 2.7% to about 3.3%, in a range of from about 2.4% to about 3.6%, or any values or subranges therebetween. At least one of, or each of, the tie layers 58, 60 of the precursor sheet 48 can have a thickness of about 0.7 mils, in a range of from about 0.6 mils to about 0.8 mils, in a range of from about 0.5 mils to about 0.9 mils, or any values or subranges therebetween. For at least one of, or each of, the tie layers 58, 60, the percentage of the volume of the precursor sheet 48 occupied by the tie layer can be about 1.6%, in a range of from about 1.4% to about 1.8%, in a range of from about 1.3% to about 1.9%, or any values or subranges therebetween. The interior or regrind layer 62 of the precursor sheet 48 can have a thickness of about 22.6 mils, in a range of from about 20.3 mils to about 24.9 mils, in a range of from about 18.1 mils to about 27.1 mils, or any values or subranges therebetween. The percentage of the volume of the precursor sheet 48 occupied by the interior or regrind layer 62 can be about 22.6%, in a range of from about 20.3% to about 24.9%, in a range of from about 18.1% to about 27.1%, or any values or subranges therebetween. Other values and ranges are within the scope of this disclosure.

As best understood with reference to FIGS. 1-3, the sheet 48 may include: at least three layers positioned between the interior layer 60 and the container cavity 16, at least four layers positioned between the interior layer 60 and the container cavity 16, at least five layers positioned between the interior layer 60 and the container cavity 16, or five layers positioned between the interior layer 60 and the container cavity 16. Variations are within the scope of this disclosure. For example, the inner cap layer 50 can be covered by at least one skim layer (see, e.g., skim coat 94' of FIG. 11), so that the skim layer is in opposing face-to-face relation with, and defines, the container cavity 16 and is adhered to the cover 34. Accordingly, the sheet 48 may include: at least six layers positioned between the interior layer 60 and the container cavity 16, six layers positioned between the interior layer 60 and the container cavity 16, or any other suitable number of layers positioned between the interior layer 60 and the container cavity 16.

Other embodiments are within the scope of this disclosure. For example, a second embodiment can be like the first embodiment, except for variations noted and variations that will be apparent to those of ordinary skill in the art. In the second embodiment, the container 10 (FIGS. 1 and 2) is thermoformed from a coextruded sheet (e.g., a thermoplastic multilayered sheet or "the precursor sheet") comprising polyolefin-based material, for example PP. At least some of the PP can be PCR PP that is encapsulated in the precursor sheet, for example by being included in one or more interior layers of the precursor sheet, as discussed further below.

Figure 4:
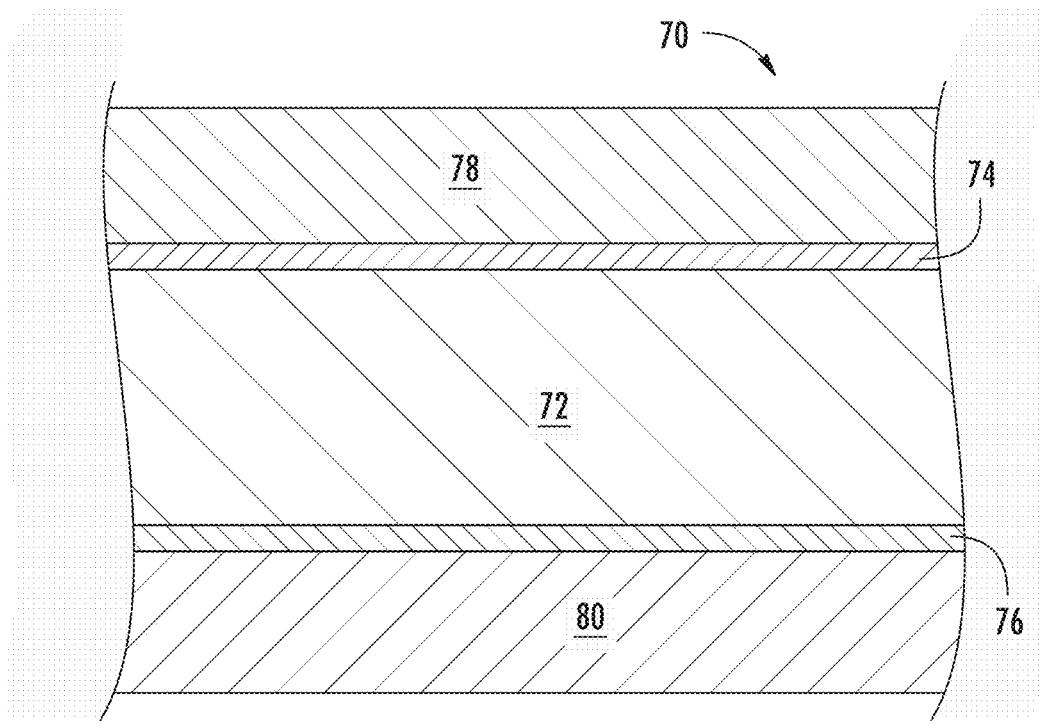
FIG. 4 is a schematic cross-sectional view of a portion of material that is representative of both the material of the container of FIG. 1, and a precursor sheet from which the container of FIG. 1 can be thermoformed, wherein in FIG. 4 the material is depicted at a relatively high level of abstraction, in accordance with a second embodiment of this disclosure.

FIG. 4 is a schematic cross-sectional view of a portion of an example of a laminate/thermoplastic sheet 70 of the second embodiment, wherein the cross section is taken through the thickness of the thermoplastic sheet, and in FIG. 4 the material is depicted at a relatively high level of abstraction. In the second embodiment, the thermoplastic sheet 70 is representative of (e.g., substantially representative of) both the precursor sheet from which the container 10 can be thermoformed and the thermoplastic sheet of the fully-formed container 10.

The second embodiment thermoplastic sheet 70 can be formed by coextrusion and/in any other suitable manner so an interior layer 72 comprising PCR polymeric material is positioned (e.g., encapsulated or sandwiched) between inner and outer barrier layers 74, 76 (e.g., high barrier layers), and the inner and outer barrier layers are positioned between inner and outer layers 78, 80. The interior layer 72 can comprise, consist of, or consist essentially of PCR polymeric material (e.g., PCR PP). As a more specific example, the interior layer 72 can comprise, consist essentially of, or consist of the PCR polymeric material and regrind. Percentages of the PCR polymeric material in the interior layer 72 can be the same as discussed above for the first embodiment's interior layer 62.

In the second embodiment, each container 10 is thermoformed from a section of precursor sheet 70 such that the outer layer 80 defines at least most of the exterior surface of the container, and the inner layer 78 is in opposing face-to-face relation with, and defines, the container cavity 16 (FIGS. 1 and 2). One or more of the layers 72, 74, 76, 78, 80 may be omitted or rearranged in the sheet 70, and/or one or more additional layers may be included in the sheet 70. For example, the inner layer 78 can be covered by at least one skim layer (see, e.g., skim coat 94' of FIG. 11), so that the skim layer is in opposing face-to-face relation with, and defines, the container cavity 16 and is adhered to the cover 34 (FIG. 2).

The thermoplastic sheet 70 as a whole is typically substantially impermeable and imperforate, at least partially due to, or mostly due to, the inner and outer barrier layers 74, 76 being configured to restrict passage of gasses (e.g., air, nitrogen gas, water vaper, and volatilized aroma compounds). The material of the barrier layers 74, 76 can have barrier properties exceeding barrier properties of the other layers of the sheet 70. The barrier layers 74, 76 can comprise, consist essentially of, or consist of ethylene vinyl alcohol (EVOH), although the one or more barrier layers of the sheet 70 may more generally comprise EVOH, nylon, G-polymer, and/or any other suitable material. Each of the inner and outer layers 78, 80 can comprise, consist of, or consist essentially of PP (e.g., virgin PP).

The PCR-containing interior layer 72 (e.g., polyolefin (e.g., PP and/or PE) and/or thermoplastic polyester (e.g., polyethylene terephthalate)) and any other of the PCR polymeric material of the thermoplastic sheet 70 can be positioned inside the sheet 70 in a manner so that the PCR polymeric material will not come in contact with food contained by the container 10. In the second embodiment, the interior layer 72 (e.g., 100% PCR polymer layer or its blends (0-100%) with virgin resin and/or regrind) is sandwiched between the two high barrier polymer layers 74, 76 (e.g., EVOH, nylon, G-polymer, and/or any other suitable material), and this structural arrangement provides improved organoleptic performance.

Figure 5:
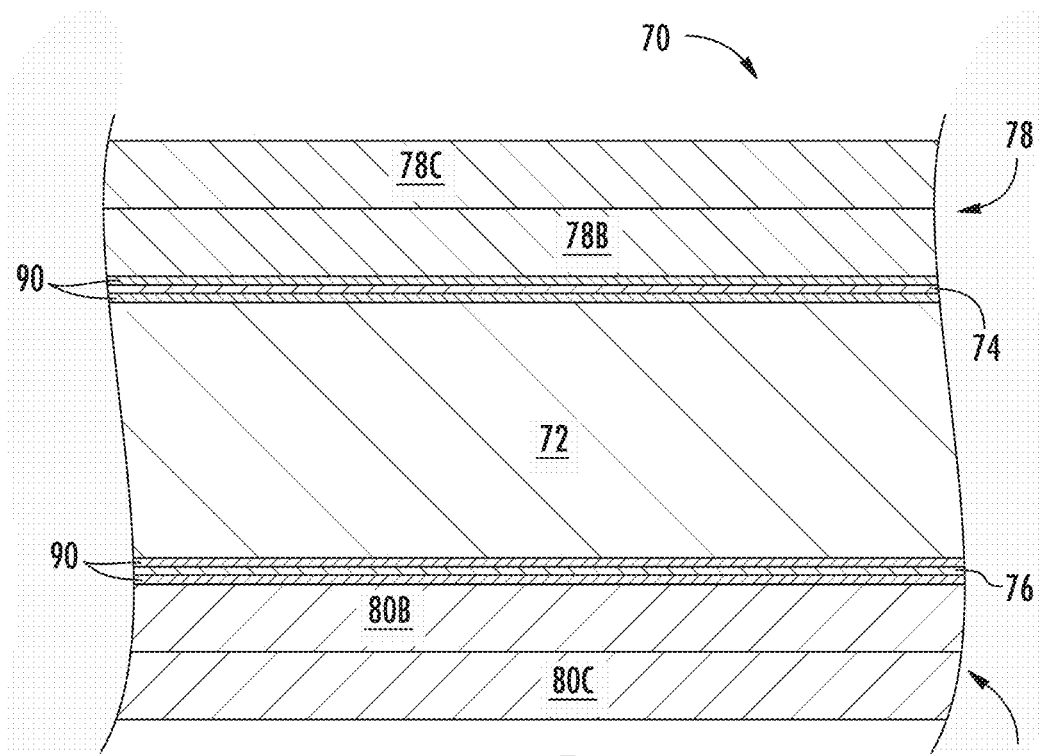
FIG. 5 is similar to FIG. 4 yet more detailed, in accordance with the second embodiment.

As compared to FIG. 4, FIG. 5 is a more detailed schematic cross-sectional view of the thermoplastic sheet 70 of the second embodiment. As depicted in FIG. 5, the inner portion 78 can include an inner cap layer 78C and an inner buffer layer 78B, and the outer portion 80 can include an outer cap layer 80C and an outer buffer layer 80B. As an example, the PCR polymeric material (e.g., PCR PP) can be omitted from one or more of, or omitted from each of, the cap and buffer layers 78C, 78B, 80C, 80B; and each of the cap and buffer layers can comprise, consist essentially of, or consist of virgin polymeric material (e.g., virgin PP). As a more specific example, the PCR polymeric material (e.g., PCR PP) can be omitted from each of the cap layers 78C, 80C; each of the cap layers 78C, 80C can comprise, consist essentially of, or consist of virgin polymeric material (e.g., virgin PP) and white colorant, wherein the white colorant may be omitted; and each of the buffer layers 78B, 80B can comprise, consist essentially of, or consist of virgin polymeric material (e.g., virgin PP), regrind, and white colorant, wherein the regrind and/or white colorant may be omitted.

As examples, for one or more of, or each of, the cap and buffer layers 78C, 78B, 80C, 80B, at least about 90% by weight of the polymeric material of the layer can be virgin polymer, at least about 93% by weight of the polymeric material of the layer can be virgin polymer, at least about 96% by weight of the polymeric material of the layer can be virgin polymer, at least about 98% by weight of the polymeric material of the layer can be virgin polymer, at least about 99% by weight of the polymeric material of the layer can be virgin polymer, at least about 99.5% by weight of the polymeric material of the layer can be virgin polymer, at least about 99.9% by weight of the polymeric material of the layer can be virgin polymer, 100% by weight of the polymeric material of the layer can be virgin polymer, at least about 90% by weight of the layer can be virgin polymer, at least about 93% by weight of the layer can be virgin polymer, at least about 96% by weight of the layer can be virgin polymer, at least about 98% by weight of the layer can be virgin polymer, at least about 99% by weight of the layer can be virgin polymer, at least about 99.5% by weight of the layer can be virgin polymer, at least about 99.9% by weight of the layer can be virgin polymer, 100% by weight of the layer can be virgin polymer, or any ranges or values therebetween.

In the example depicted in FIG. 5, the cap layers 78C, 80C are outer or outermost layers of the sheet 70. As also depicted in FIG. 5, tie layers 90 respectively provide the connection between the inner barrier layer 74 and the inner buffer layer 78B, the connection between the inner barrier layer 74 and the interior layer 72, the connection between the outer barrier layer 74 and the outer buffer layer 80B, and the connection between the outer barrier layer 76 and the interior layer 72. The tie layers 90 can comprise PP modified with polymeric tie material (e.g., maleic anhydride and/or any other suitable materials).

Figure 6:
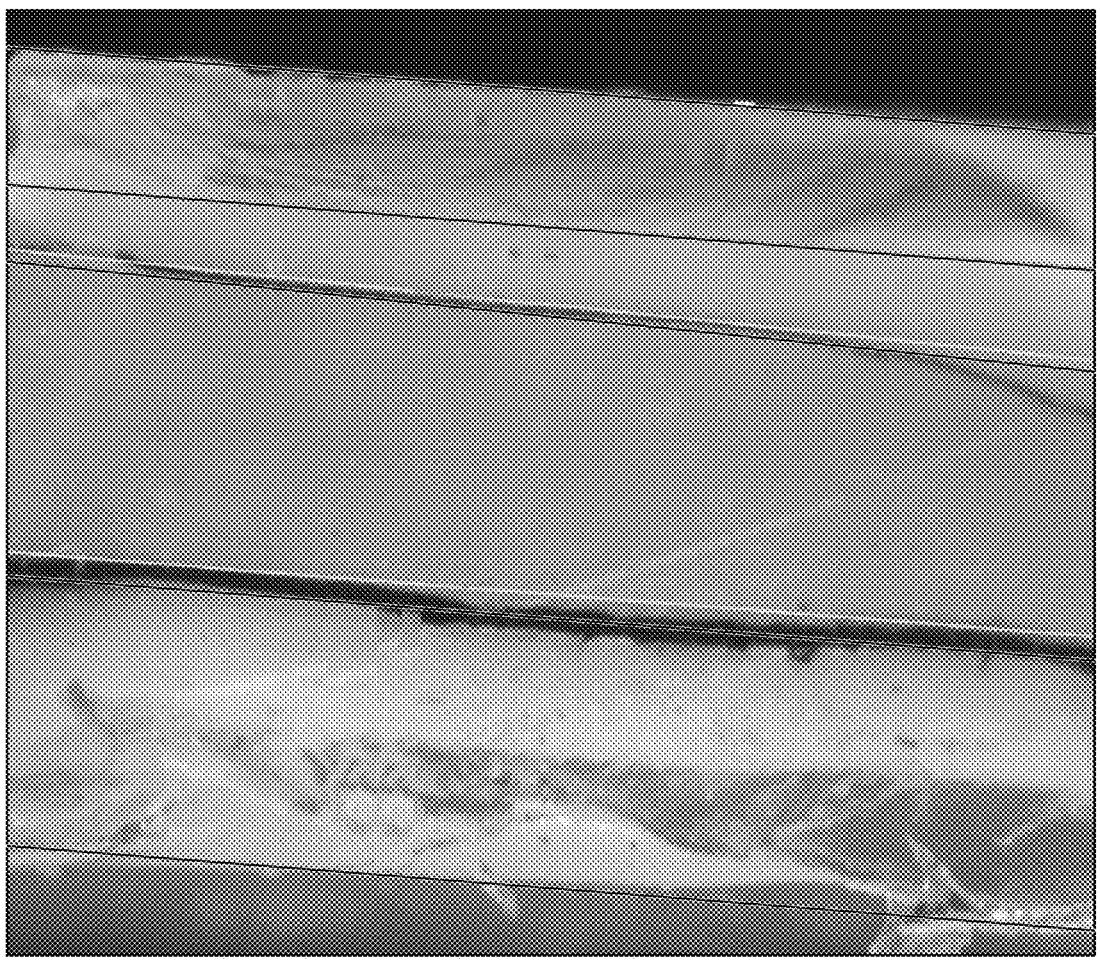
FIG. 6 substantially is a micrograph of a cross section of a portion of material that is representative of both the material of the container of FIG. 1, and a precursor sheet from which the container of FIG. 1 can be thermoformed, in accordance with the second embodiment.

FIG. 6 substantially depicts a micrograph (e.g., microscopic layer profile) of a portion of an example of a coextruded, thermoformable thermoplastic sheet including PCR polymeric material that is believed to be representative of (e.g., substantially representative of) both the precursor sheet from which the container 10 can be thermoformed and the thermoplastic sheet of the fully-formed container 10, wherein the PCR polymeric material can comprise, consist of, or consist essentially of PCR PP, in accordance with the second embodiment.

Figure 7:
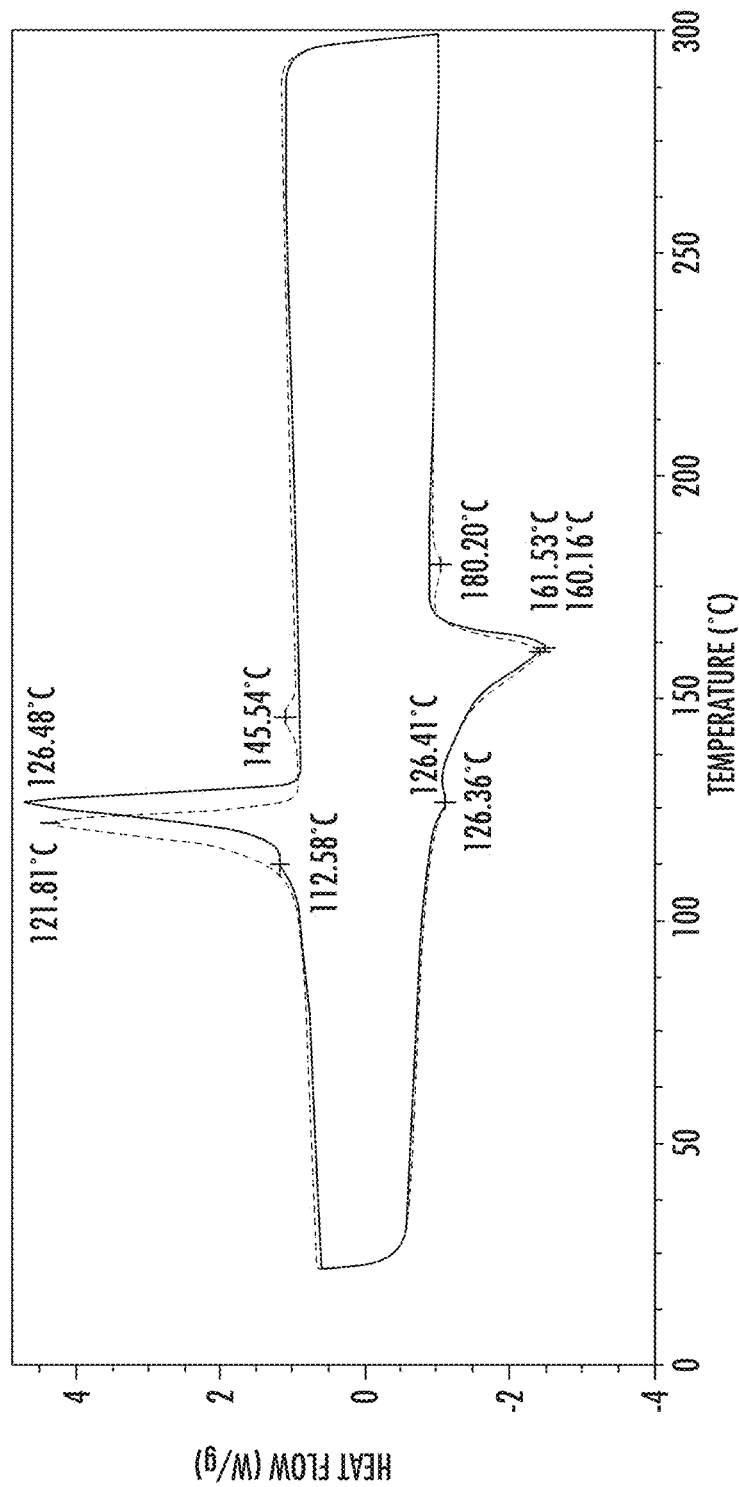
FIG. 7 depicts a graph of differential scanning calorimetry data for an example of material that is representative of both the material of the container of FIG. 1, and a precursor sheet from which the container of FIG. 1 can be thermoformed, in accordance with an example of the second embodiment.

FIG. 7 depicts a graph of differential scanning calorimetry (DSC) data believed to be for a coextruded, thermoformable thermoplastic sheet that includes PCR polymeric material and is representative of both the precursor sheet from which the container 10 can be thermoformed and the thermoplastic sheet of the fully-formed container, in accordance with an example of the second embodiment. For the example of FIG. 7, the PCR polymeric material includes PCR PP, and the PCR polymeric material further includes PE as a contaminant. For the example of FIG. 7, the PE fraction of the PCR polymeric material is identified by the thermal event having an exothermic peak of 126.36 degrees Celsius.

Figure 8:
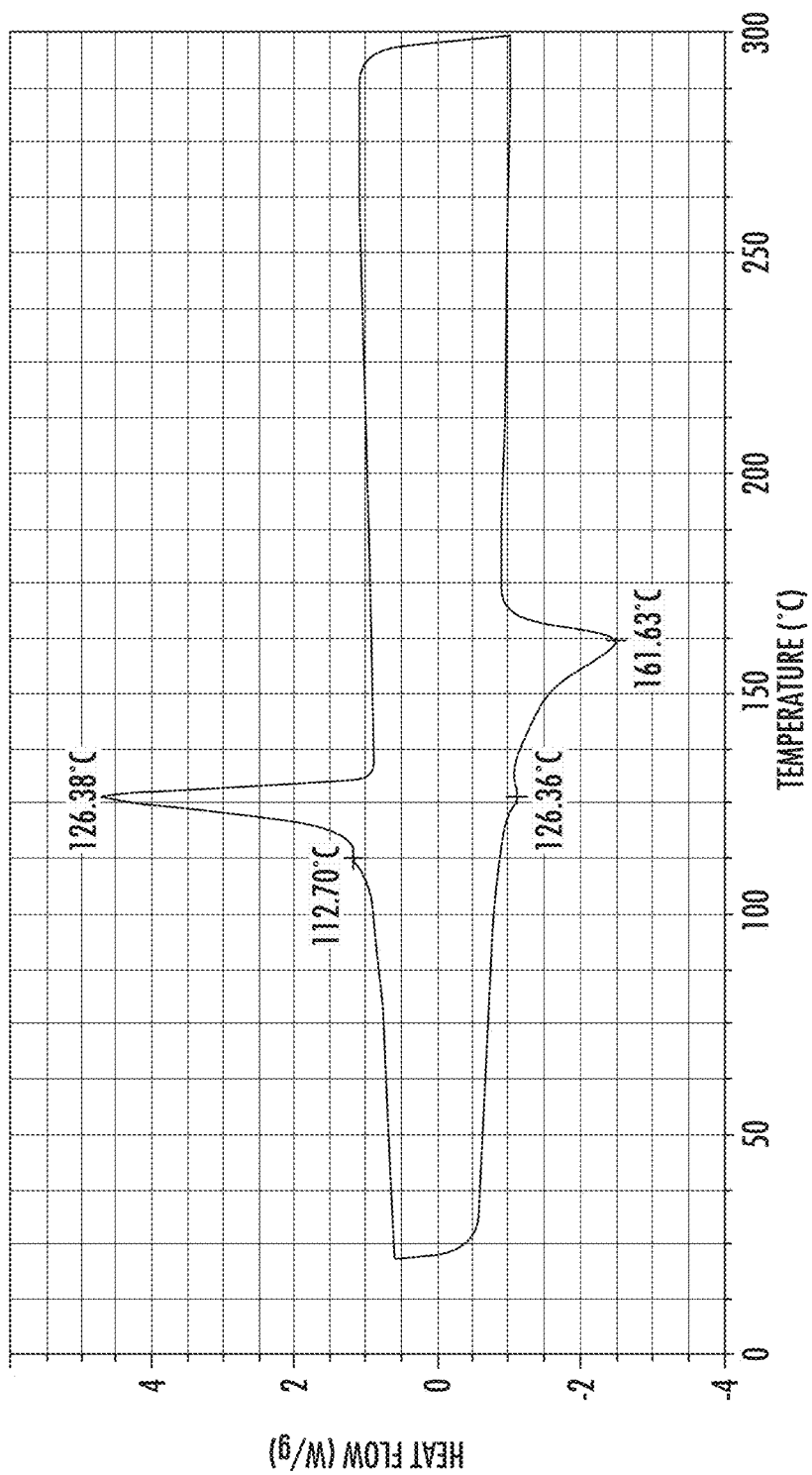
FIG. 8 depicts a graph of differential scanning calorimetry data for an example of post-consumer recycled polypropylene that includes polyethylene as a contaminant.

FIG. 8 depicts a graph of DSC data for an example of PCR PP that can be included in both the precursor sheet from which the container 10 can be thermoformed and the thermoplastic sheet of the fully-formed container 10, wherein the PCR PP material contains PE as a contaminant. For the example of FIG. 8, the PE fraction of the PCR polymeric material is identified by the thermal event having an exothermic peak of 126.36 degrees Celsius.

Figure 9:
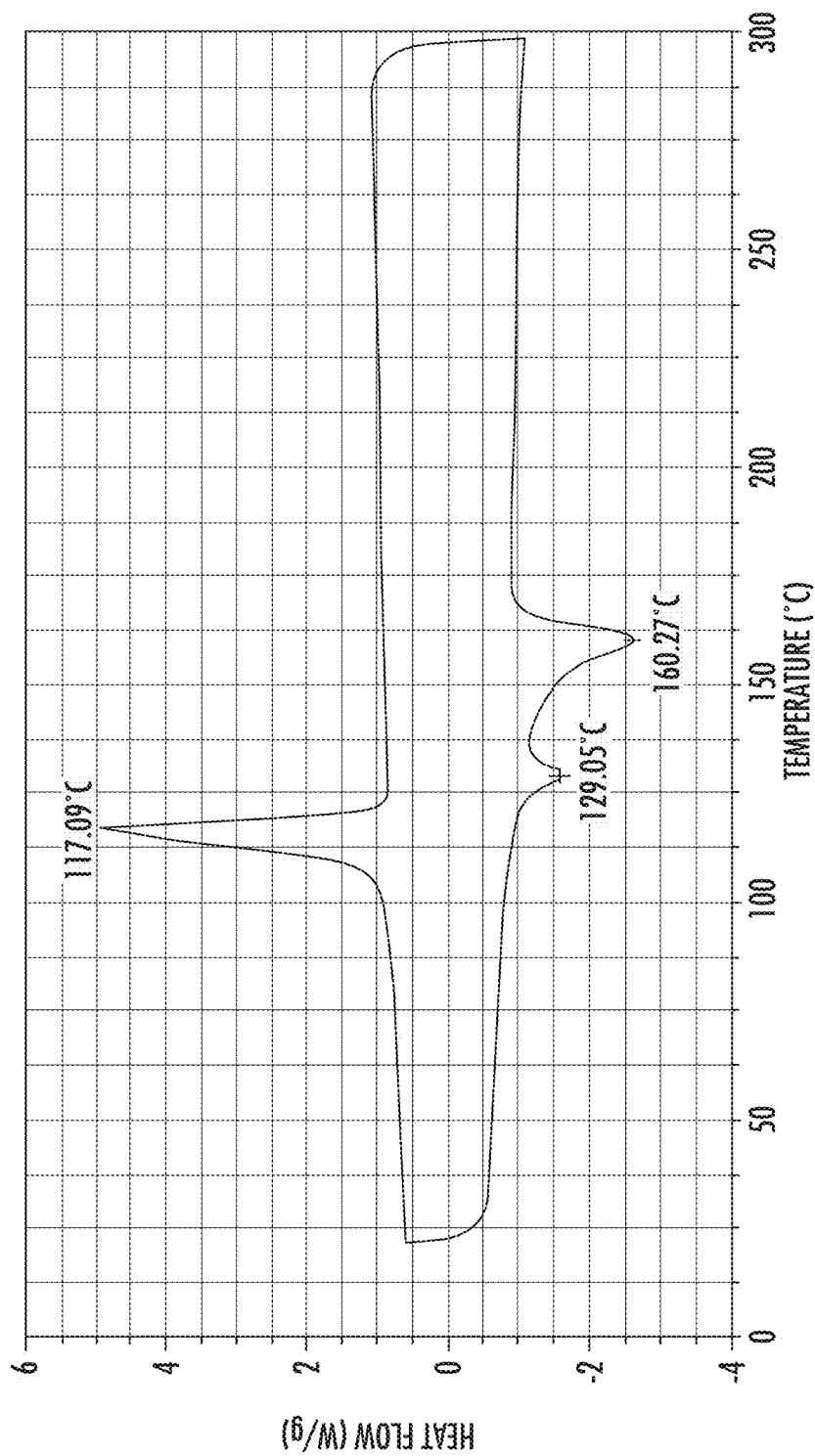
FIG. 9 depicts another graph of differential scanning calorimetry data for an example of post-consumer recycled polypropylene that includes polyethylene as a contaminant.

FIG. 9 depicts a graph of DSC data for another example of PCR PP that can be included in both the precursor sheet from which the container 10 can be thermoformed and the thermoplastic sheet of the fully-formed container 10, wherein the PCR PP contains PE as a contaminant. For the example of FIG. 9, the PE fraction of the PCR polymeric material is identified by the thermal event having an exothermic peak of 129.05 degrees Celsius.

Figure 10:
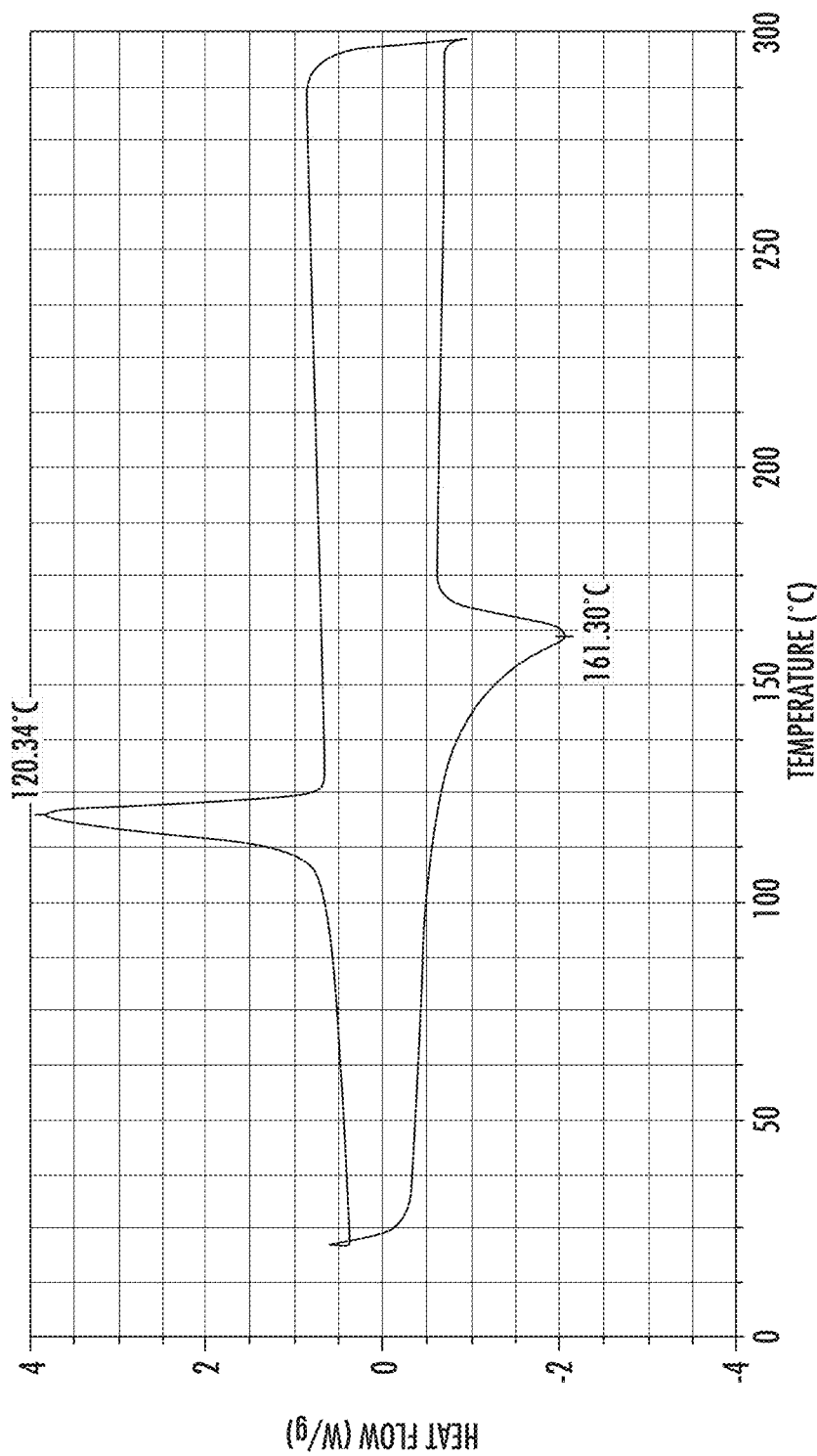
FIG. 10 depicts a graph of differential scanning calorimetry data for an example of polypropylene that does not include polyethylene as a contaminant.

As a contrasting example, FIG. 10 depicts a graph of DSC data for virgin PP (i.e., PP that does not include PE as a contaminant). Accordingly, FIG. 10 lacks a thermal event having an exothermic peak indicative of PE. As compared to FIG. 10, in FIGS. 8 and 9 there are additional melting peaks at about 129 degrees Celsius and 126 degrees Celsius which correspond to PE. A similar peak for PE is present in FIG. 7. In contrast, FIG. 10 does not include any indication of a PE melting peak.

Organoleptic testing has been performed for containers embraced by this disclosure as indicated in the following paragraphs.

Test DIN 10955

Test Conditions: water (2h/70 degrees Celsius)

Test Cups: encapsulated PCR structure coffee pod (sample 1) and oatmeal cup (sample 2)

Testers: 6 test persons

Test summary: Sample cups 1 and 2 were analyzed following German standard test DIN 10955. Water was added to sample cups and conditioned for 2 hours at 70 degrees Celsius prior to sensory panel tasting. After 2 hours, water from the sample cups was collected and used to compare with control (water, no cup pre-conditioning). Six test persons participated in the sensory testing to compare the difference of water in terms of appearance, odor and taste. An evaluation scale of 0-4 was used for evaluation. Samples were considered to pass if the score was no higher than 2.5. According to the test results, both samples passed the test. It this regard, it is believed that any aberration from control was very slight or nonexistent.

Triangle Sensory Test

Test Cups: encapsulated PCR structure oatmeal cup (sample 2)

Testers: 12 test persons

Test summary: Sample cup 2 was analyzed using triangle test method. Non PCR PP cups were used as control. Both sample cups and control cups were filled with hot water (having a temperature of about 85 degrees Celsius) and allowed to cool until reaching room temperature. Then the water was collected and transferred to sensory test shots labeled with random codes for panelists to evaluate. For each panelist, there were 3 samples (2 same, 1 odd) and they were asked to choose the odd one in terms of odor and taste. According to the test results, only one panelist out of 12 was able to choose the odd one. In this regard, it is believed that there was minimal or no organoleptic impact from sample cup 2.

At least partially reiterating from above, an aspect of this disclosure is the provision of multilayer polyolefin (e.g., PP and/or PE) and/or polyester (e.g., polyethylene terephthalate) sheets including PCR polymeric material content from 0% to 100%. Such multilayer sheets can be coextruded and then be thermoformed into containers (e.g., single-serve and/or heat-sealable containers). The multilayer sheet may or may not contain a layer of high oxygen or aroma barrier polymer/polymer blends.

Other examples are within the scope of this disclosure. For example, the precursor sheets 48, 70 (FIGS. 3-5) and containers 10 (FIGS. 1 and 2) can include different numbers of layers (e.g., can include one or more additional layers). For example and at least partially reiterating from above, the first embodiment precursor sheet 48 and associated containers 10 can further include at least one skim layer or coat (see, e.g., skim coat 94' of FIG. 11) covering the inner cap layer 50, so that the skim layer is in opposing face-to-face relation with, and defines, the container cavity 16; and the cover 34 (FIG. 2) is adhered to the flange's portion of skim layer. That is, in one example of the first embodiment the sheet 48 and associated container 10 comprises, consists essentially of, or consists of eight layers, although different numbers of layers are within the scope of this disclosure.

As a similar example and at least partially reiterating from above, the second embodiment precursor sheet 70 (FIGS. 4 and 5) and associated container 10 can further include at least one skim layer or coat (see, e.g., skim coat 94' of FIG. 11) covering the inner cap layer 78C, so that the skim layer is in opposing face-to-face relation with, and defines, the container cavity 16; and the cover 34 (FIG. 2) is adhered to the flange's portion of the skim layer. That is, in one example of the second embodiment the sheet 48 and associated container 10 comprises, consists essentially of, or consists of twelve layers, although different numbers of layers are within the scope of this disclosure. The skim layers of the first and second embodiments can comprise, consist essentially of, or consist of PP and/or any other suitable materials.

As best understood with reference to FIGS. 1, 2, 4 and 5, the sheet 70 may include: at least two layers positioned between the interior layer 72 and each of the container cavity 16 and the exterior surface of the container 10, at least three layers positioned between the interior layer 72 and each of the container cavity 16 and the exterior surface of the container, at least four layers positioned between the interior layer 72 and each of the container cavity 16 and the exterior surface of the container, at least five layers positioned between the interior layer 72 and each of the container cavity 16 and the exterior surface of the container, at least six layers positioned between the interior layer 72 and each of the container cavity 16 and the exterior surface of the container, or any other suitable number of layers positioned between the interior layer 72 and each of the container cavity 16 and the exterior surface of the container 10.

Figure 11:
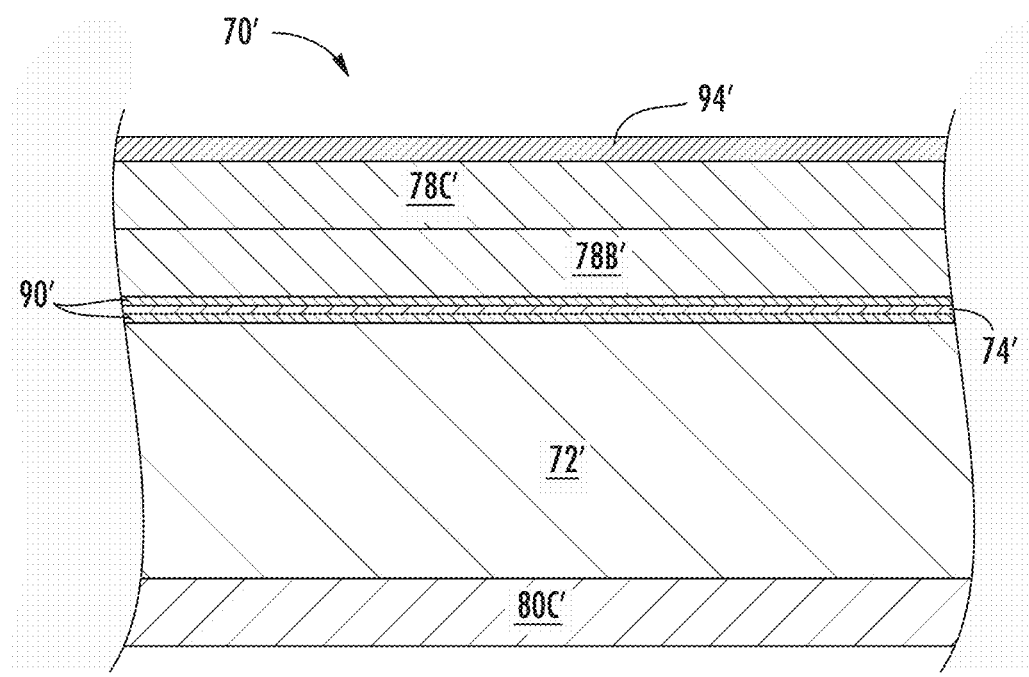
FIG. 11 is a schematic cross-sectional view of a portion of material that is representative of both the material of the container of FIG. 1, and a precursor sheet from which the container of FIG. 1 can be thermoformed, in accordance with a third embodiment of this disclosure.

A third embodiment of this disclosure can be like the first embodiment and/or the second embodiment, except for variations noted and variations that will be apparent to those of ordinary skill in the art. More specifically, in one example the third embodiment can be identical to above-described version of the first embodiment that includes the skim coat 94' (FIG. 11).

The container 10 (FIGS. 1 and 2) of the third embodiment can be thermoformed from a sheet (e.g., a thermoplastic multilayered sheet or "the precursor sheet") that is at least partially formed by coextrusion and/in any other suitable manner, and that includes polyolefin-based material, for example PP, and/or other suitable polymeric material. At least some of the PP can be PCR PP that is encapsulated in the precursor sheet, for example by being included in one or more interior layers of the precursor sheet FIG. 11 is a schematic cross-sectional view of a portion of an example of a laminate/thermoplastic sheet 70' of the third embodiment, wherein the cross section is taken through the thickness of the thermoplastic sheet. In the third embodiment, the thermoplastic sheet 70' is representative of (e.g., substantially representative of) both the precursor sheet from which the container 10' can be thermoformed and the thermoplastic sheet of the fully-formed container 10'.

The third embodiment thermoplastic sheet 70' can be formed at least partially by coextrusion and/in any other suitable manner so an interior layer 72' comprising PCR polymeric material is encapsulated or sandwiched in the sheet, and the sheet includes at least one barrier layer 74'. The interior layer 72' can comprise, consist of, or consist essentially of PCR (e.g., PCR PP). As a more specific example, the interior layer 72' can comprise, consist essentially of, or consist of the PCR polymeric material (e.g., PCR PP) and regrind.

The thermoplastic sheet 70' as a whole is typically substantially impermeable and imperforate, at least partially due to, or mostly due to, the barrier layer 74' being configured to restrict passage of gasses, water vaper, light, and aroma compounds. The barrier layer 74' can comprise, consist essentially of, or consist of ethylene vinyl alcohol (EVOH), although the one or more barrier layers of the sheet 70' may more generally comprise EVOH, nylon, G-polymer, and/or any other suitable material.

The PCR polymeric material (e.g., polyolefin (e.g., PP and/or PE) and/or thermoplastic polyester (e.g., polyethylene terephthalate)) can be positioned inside the thermoplastic sheet 70' in a manner so that the PCR polymeric material will not come in contact with food contained by the container 10'. For example, the PCR-containing interior layer 72' and any other PCR of the thermoplastic sheet 70' can be positioned inside the thermoplastic sheet in a manner so that the PCR polymeric material will not come in contact with food contained by the container 10'. In the third embodiment container 10', the high barrier polymer layer 74' (e.g., EVOH, nylon, G-polymer, and/or any other suitable material) is positioned between the container cavity 16 (FIGS. 1 and 2) and the interior layer 72' (e.g., 100% PCR polymer layer or its blends (0-100%) with virgin resin and/or regrind) to provide improved organoleptic performance.

As depicted in FIG. 11, tie layers 90' respectively provide the connection between the inner barrier layer 74' and the interior layer 72', and the connection between the inner barrier layer 74' the inner buffer layer 78B'. The tie layers 90' can comprise PP modified with polymeric tie material (e.g., maleic anhydride and/or any other suitable materials).

The interior layer 72' can be connected directly to the inner side of the outer cap layer 80C'. The outer side of the inner buffer layer 78B' can be connected directly to the inner side of the inner cap layer 78C'. An outer or outermost layer of the thermoplastic sheet 70' can be a skim layer or coat 94' that can be connected directly to the outer side of the inner cap layer 78C'.

The PCR polymeric material (e.g., PCR PP) can be omitted from one or more of, or each of, the cap, buffer, and skim layers 78C', 78B', 80C', 94'. Each of the cap, buffer, and skim layers 78C', 78B', 80C', 94' can comprise, consist essentially of, or consist of virgin polymeric material (e.g., virgin PP). As a more specific example, the PCR polymeric material (e.g., PCR PP) can be omitted from each of the cap and skim layers 78C', 80C', 94; each of the cap layers 78C', 80C' can comprise, consist essentially of, or consist of virgin polymeric material (e.g., virgin PP) and white colorant, wherein the white colorant may be omitted; the buffer layer 78B' can comprise, consist essentially of, or consist of virgin polymeric material (e.g., virgin PP), regrind, and white colorant, wherein the regrind and/or white colorant may be omitted; and the skim layer or coat 94' can comprise, consist essentially of, or consist of virgin polymeric material (e.g., virgin PP). The skim layer or coat 94' may further include one or more additives configured to enhance peelable removal of any associated cover 34.

In the example depicted in FIG. 11, the cap layer 80C' and skim layer or coat 94' are outer or outermost layers of the thermoplastic sheet 70'. In the third embodiment, each container 10' is thermoformed from a section of the precursor thermoplastic sheet 70' such that: the skim layer 94' is in opposing face-to-face relation with, and defines, the container cavity 16' (FIGS. 1 and 2), and the skim layer 94' covers the annular face of the rim 18' to which the cover 34' is adhered (i.e., the cover is adhered to the flange's portion of the skim layer).

The numbers of layers of the sheet 70' that are positioned between the interior layer 72' and the container cavity 16 can be as discussed above for the first embodiment sheet 48. Percentages of the PCR polymeric material in the interior layer 72' can be the same as discussed above for the first embodiment's interior layer 62. As examples, for one or more of, or each of, the cap, buffer, and skim layers 78C', 78B', 80C', 94', at least about 90% by weight of the polymeric material of the layer can be virgin polymer, at least about 93% by weight of the polymeric material of the layer can be virgin polymer, at least about 96% by weight of the polymeric material of the layer can be virgin polymer, at least about 98% by weight of the polymeric material of the layer can be virgin polymer, at least about 99% by weight of the polymeric material of the layer can be virgin polymer, at least about 99.5% by weight of the polymeric material of the layer can be virgin polymer, at least about 99.9% by weight of the polymeric material of the layer can be virgin polymer, 100% by weight of the polymeric material of the layer can be virgin polymer, at least about 90% by weight of the layer can be virgin polymer, at least about 93% by weight of the layer can be virgin polymer, at least about 96% by weight of the layer can be virgin polymer, at least about 98% by weight of the layer can be virgin polymer, at least about 99% by weight of the layer can be virgin polymer, at least about 99.5% by weight of the layer can be virgin polymer, at least about 99.9% by weight of the layer can be virgin polymer, 100% by weight of the layer can be virgin polymer, or any ranges or values therebetween.

Figure 12:
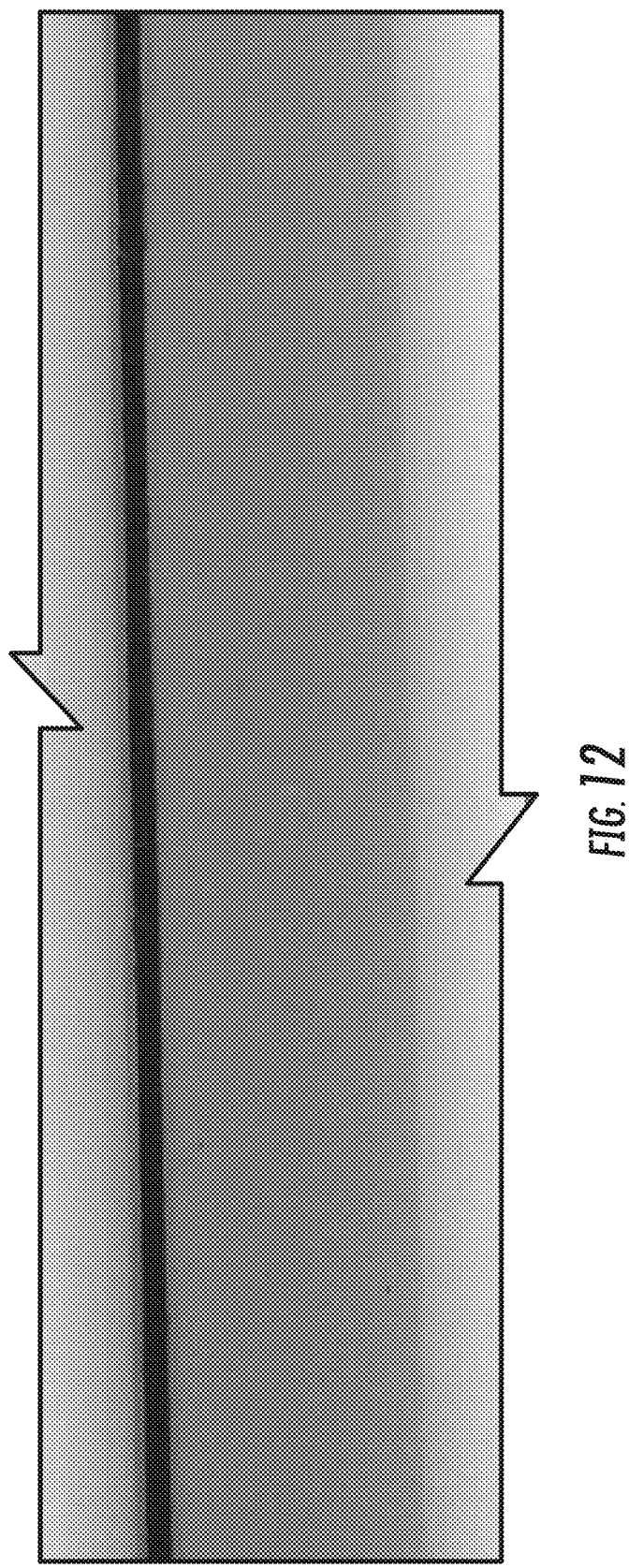
FIG. 12 is a micrograph of a cross section of a portion of material that is representative of both the material of the container of FIG. 1, and a precursor sheet from which the container of FIG. 1 can be thermoformed, in accordance with the third embodiment.

FIG. 12 is a micrograph (e.g., microscopic layer profile) of a portion of an example of a coextruded, thermoformable thermoplastic sheet including PCR polymeric material that is believed to be representative of (e.g., substantially representative of) both the precursor sheet 70' from which the container 10 can be thermoformed and the thermoplastic sheet of the fully-formed container 10, wherein the PCR polymeric material can comprise, consist of, or consist essentially of PCR PP, in accordance with the third embodiment. One or more of the layers of the thermoplastic sheet 70' may be omitted or rearranged, and/or one or more additional layers may be included in the thermoplastic sheet 70.

Throughout the Detailed Description section of this disclosure, terms such as "substantially," "about," "proximate," and the like, have been used for the purpose of providing a range of examples. For example and reiterating from above, it is within the scope of this disclosure for one or more of the terms "substantially," "about," "approximately," and/or the like, to qualify each of the adjectives and adverbs of the Detailed Description section of disclosure. It is believed that those of ordinary skill in the art will readily understand that, in different implementations of the features of this disclosure, reasonably different engineering tolerances, precision, and/or accuracy may be applicable. Accordingly, it is believed that those of ordinary skill will readily understand the usage herein of the terms such as "substantially," "about," "proximate," and the like.

To supplement the present disclosure, this application incorporates entirely by reference commonly assigned U.S. Pat. No. 9,950,849 (which discloses, e.g., skim coats).

In the above description and/or figures, examples of embodiments have been disclosed. The present invention is not limited to such exemplary embodiments. Unless otherwise noted, specific terms have been used in a generic and descriptive sense and not for purposes of limitation. The use of the term "and/or" includes any and all combinations of one or more of the associated listed items.

What is claimed is:

1. A thermoformed container for food storage, the container comprising:
    a polymeric multilayer sheet at least partially defining each of a base of the container and at least one sidewall of the container, wherein the at least one sidewall extends upwardly from a periphery of the base, the at least one sidewall extends around a cavity of the container, and the cavity is configured for containing food, and wherein:
    the sheet comprises a polymeric interior layer positioned between (i) a polymeric outer layer of the sheet and (ii) a plurality of inner layers of the sheet;
    the interior layer comprises post-consumer recycled (PCR) polymeric material, the PCR polymeric material including an aroma compound;
    the plurality of inner layers comprises:
        an inner surface in opposing face-to-face relation with, and at least partially defining, the cavity of the container,
        an inner polymeric barrier layer positioned between the cavity and the interior layer, wherein the inner barrier layer is configured to restrict passage of gasses, including the inner barrier layer being configured to restrict inward passage of at least some of any aroma compound-derived gasses originating from the PCR polymeric material,
        an inner cap layer positioned between the cavity of the container and the inner barrier layer,
        a buffer layer positioned between the inner cap layer and the inner barrier layer,
        an inner tie layer positioned between the buffer layer and the inner barrier layer, the inner tie layer in a facing, directly contacting relationship with the buffer layer, and
        an outer tie layer positioned between the inner barrier layer and the interior layer, and
    the sheet further comprises an outer barrier layer positioned between the outer layer and the interior layer, wherein the outer barrier layer is configured to restrict passage of gasses, including the outer barrier layer being configured to restrict outward passage of at least some of any aroma compound-derived gasses originating from the PCR polymeric material.

2. The container according to claim 1, wherein:
    at least four layers of the sheet are positioned between the interior layer and the exterior surface of the container.

3. The container according to claim 1, wherein:
    the PCR polymeric material comprises thermoplastic polyolefin and/or thermoplastic polyester;
    the inner and outer barrier layers comprise thermoplastic polymeric material having barrier properties;
    the barrier properties of the inner and outer barrier layers' thermoplastic polymeric material exceed barrier properties of thermoplastic polyolefin; and
    the barrier properties of the inner and outer barrier layers' thermoplastic polymeric material exceed barrier properties of thermoplastic polyester.

4. The container according to claim 3, wherein:
    the PCR polymeric material comprises thermoplastic polyolefin; and
    the inner and outer barrier layers comprise ethylene vinyl alcohol.

5. The container according to claim 1, wherein:
    the plurality of inner layers comprises an innermost polymeric layer that includes the inner surface that is in opposing face-to-face relation with, and at least partially defines, the cavity of the container; and
    the innermost layer includes polymeric material, and at least about 90% by weight of the polymeric material of the innermost layer is virgin polymer.

6. The container according to claim 5, wherein the innermost layer further comprises a colorant.

7. The container according to claim 6, comprising an annular, outwardly protruding flange extending from an upper end of the at least one sidewall opposite the base and surrounding an opening to the cavity,
    the innermost polymeric layer of the plurality of inner layers defines an upper surface of the outwardly protruding flange,
    the outer layer of the sheet includes an outer surface, the outer surface of the outer layer defines an exterior surface of the container, the outer surface of the outer layer defines a lower surface of the outwardly protruding flange, the outer layer includes polymeric material, at least about 90% by weight of the polymeric material of the outer layer is virgin polymer, and the outer layer further comprises a colorant, and the innermost polymeric layer and the outer layer substantially conceal the PCR polymeric material of the interior layer from view by a consumer.

8. The container according to claim 7, wherein:
the PCR polymeric material of the interior layer is gray in color, and
the innermost polymeric layer and the outer layer substantially conceal the gray color of the PCR polymeric material of the interior layer from view by a consumer.

9. The container according to claim 1, wherein:
the outer layer includes an outer surface;
the outer surface of the outer layer defines an exterior surface of the container; and
the outer layer includes polymeric material, and at least about 90% by weight of the polymeric material of the outer layer is virgin polymer.

10. The container according to claim 9, wherein the outer layer is at least about 90% by weight virgin polymer.

11. The container according to claim 9, wherein the outer layer further comprises a colorant.

12. The container according to claim 9, wherein:
the outer layer is an outer cap layer.

13. The container according to claim 1, comprising an annular, outwardly protruding flange extending from an upper end of the at least one sidewall opposite the base and surrounding an opening to the cavity,
the inner cap layer includes the inner surface that is in opposing face-to-face relation with, and at least partially defines, the cavity of the container and defines an upper surface of the outwardly protruding flange,
the outer layer of the sheet includes an outer surface, the outer surface of the outer layer defines an exterior surface of the container, the outer surface of the outer layer defines a lower surface of the outwardly protruding flange, the outer layer includes polymeric material, at least about 90% by weight of the polymeric material of the outer layer is virgin polymer, and the outer layer further comprises a colorant, and
the inner cap layer and the outer layer substantially conceal the PCR polymeric material from view by a consumer.

14. The container according to claim 13, wherein:
the PCR polymeric material of the interior layer is gray in color,
the inner cap layer includes a polymeric material, at least about 90% by weight of the polymeric material of the inner cap layer is virgin polymer, and the inner cap layer further comprises a colorant, and
the inner cap layer and the outer layer substantially conceal the gray color of the PCR polymeric material from view by a consumer.

15. The container according to claim 1, comprising an annular, outwardly protruding flange extending from an upper end of the at least one sidewall opposite the base and surrounding an opening to the cavity,
wherein the plurality of inner layers comprises a skim layer that includes the inner surface that is in opposing face-to-face relation with, and at least partially defines, the cavity of the container and defines an upper surface of the outwardly protruding flange,
the outer layer of the sheet includes an outer surface, the outer surface of the outer layer defines an exterior surface of the container, the outer surface of the outer layer defines a lower surface of the outwardly protruding flange, the outer layer includes polymeric material, at least about 90% by weight of the polymeric material of the outer layer is virgin polymer, and the outer layer further comprises a colorant, and
the skim layer and the outer layer substantially conceal the PCR polymeric material from view by a consumer.

16. The container according to claim 15, wherein the PCR polymeric material of the interior layer is gray in color and the skim layer and the outer layer substantially conceal the gray color of the PCR polymeric material from view by a consumer.

17. The container according to claim 15, wherein the skim layer includes one or more additives to enhance peelable removal of a cover when mounted to the upper surface of the annular, outwardly protruding flange to close the opening to the cavity of the container.

* * * * *